Dec. 13, 1966     D. K. SMOOT     3,291,536
POWDERED MATERIAL CONVEYOR SYSTEM
Filed Sept. 21, 1964
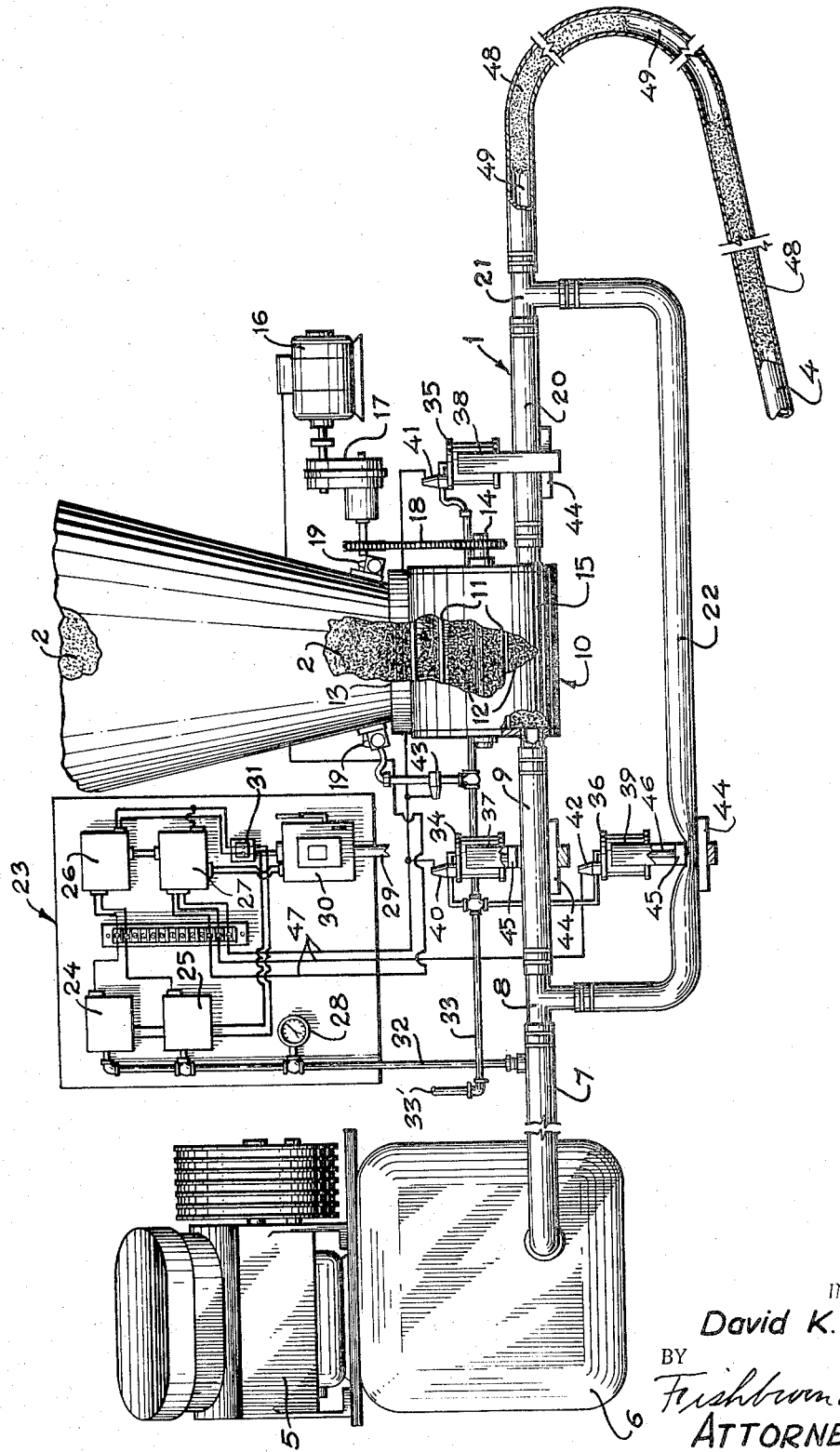
INVENTOR.
David K. Smoot
BY
Fishburn and Gold
ATTORNEYS United States Patent Office 3,291,536
Patented Dec. 13, 1966

3,291,536
POWDERED MATERIAL CONVEYOR SYSTEM
David K. Smoot, 105 Ward Parkway, Kansas City, Mo.
Filed Sept. 21, 1964, Ser. No. 397,699
11 Claims. (Cl. 302—49)

This invention relates to the handling of finely divided or powdered products and more particularly to the handling of such products which tend to compact or build up within a conveying pipe to the extent that the pipe becomes blocked.

Several finely divided or powdered products have the undesirable property of compacting and blocking conveying pipes rather than evenly flowing under the force of a pressurized conveying gas. Among such products are paint pigments and the like, for example, titanium dioxide pigments. Due to the recognized advantages of pipe conveying, several attempts have been made to overcome this difficulty but these have met with only partial success. It has been suggested, for example, to intermittently open and close the gas feeder valve communicating with the pipe to produce sudden and frequent variations of gas pressure in the closed conveyor. More recently the suggestion has been made to provide an elastic wall conveying tube which would permit the tube to expand where the material became compacted enabling the passage of loose particles around the obstruction and thereby causing its disintegration and subsequent movement through the conduit.

The principal objects of the present invention are: to provide a method and apparatus for more effectively conveying compactable finely divided material; to provide such a method and apparatus wherein back pressure in the conveying pipe is sensed to control material introduction; to provide such a method and apparatus wherein elongated slugs of the material are introduced into the conveying pipe in controlled lengths and controlled spaced apart relation; to provide such a method and apparatus wherein high pressure air is fed into the conveying pipe between the introduction of the elongated slugs so as to maintain spacing therebetween; to provide such a method and apparatus wherein a slug of the material cannot be introduced into the conveying pipe until pressure conditions at the feeder end of the pipe indicate that there is no obstruction; to provide such a conveying method and apparatus which utilizes a by-pass around the material feeder for introducing high pressure air behind the preceding slug; to provide such an apparatus which utilizes squeeze valves for conveniently opening and closing the feeder line and alternately opening and closing the by-pass line; to provide such an apparatus which includes an elastic wall conveying pipe so as to ease along motion therewithin; and to provide such a powdered material apparatus which is flexible, easily adaptable and adjustable, relatively safe in operation, simple in construction and easily maintained.

Other objects and advantages of this invention will become apparent from the following description taken in connection with the accompanying drawing wherein are set forth by way of illustration and example certain embodiments of this invention.

The figure is a partially schematic illustration of a compactable finely divided material pipe conveyor system embodying this invention.

Referring to the drawing in more detail:
The reference numeral 1 generally indicates a conveying system for compactable powdered or finely divided material 2 such as titanium dioxide pigment. The material 2, in the illustrated example, is deposited into a hopper 3 during the course of usual industrial handling. The material 2, in the practice of this invention, is transported through an elongated tube or conveying pipe 4 to a location remote from the hopper 3 by several hundred feet.

The conveying system 1 includes a source of relatively high pressure air such as an air compressor 5 which feeds into a suitable pressure storage tank 6. The tank 6 has an exit pipe 7 communicating therewith and with a T coupling 8. The coupling 8 has one branch thereof connected to a feeder inlet tube 9 of flexible material such as rubber to permit transverse collapse thereof as noted below. The feeder inlet tube 9 communicates with the input of a powdered material air-lock feeder 10 of the well-known type having a plurality of radial blades 11 which form compartments 12 therebetween.

The compartments 12 successively become isolated from the outlet 13 of the hopper 3 as the blades 11 rotate on a common drive shaft 14 in sliding contact with a cylindrical housing 15. The hopper 3 deposits the material 2 through the outlet 13 where it fills the respective compartments 12 as the shaft 14 is rotated by an electric motor 16 coupled to a suitable speed reducer 17 which is connected through a chain-sprocket drive 18 to the shaft 14. A plurality of vibrators 19 are mounted against the hopper 3 adjacent the outlet 13 to maintain the material 2 in an agitated state so it will completely fill the respective compartments 12 as the radial blades 11 rotate within the housing 15. The compartments 12, as they reach the bottom portion of the housing portion 15, successively align with the feeder inlet tube 9 and a flexible feeder outlet tube 20 whereupon high pressure air in the tube 9 urges the material 2 in the succeeding compartments 12 into and through the outlet tube 20 in the form of a substantially continuous slug as noted further below.

A T coupling 21 communicates between the feeder outlet tube 20 and the conveying tube or pipe 4. A by-pass tube 22 communicates at opposite ends thereof with the remaining branches of the T couplings 8 and 21 whereby under conditions described below air traveling through the tank exit pipe 7 by-passes the tubes 9 and 20 and the air lock feeder 10 while traveling into the conveyor tube or pipe 4.

A control panel 23 includes a high pressure switch 24, a low pressure switch 25, an "on" interval timer 26, and an "off" interval timer 27 all conventional items suitably selected to function as described below. A pressure gauge 28 is also provided for visual monitoring. A source 29 of electricity is connected to the respective timers and switches through a conventional conduit and fuse box 30 and control voltage transformer 31. The high and low pressure switches 24 and 25 and the pressure gauge 28 are connected to the pipe 7 through suitable tubing 32. Tubing 33 communicates between a conventional source 33' of compressed air and air operated cylinders 34, 35 and 36 respectively forming a part of squeeze valves 37, 38 and 39. The squeeze valves 37 and 38 are respectively associated with the feeder inlet tube 9 and the feeder outlet tube 20 and the squeeze valve 39 is associated with the by-pass tube 22. The squeeze valves 37, 38 and 39 are respectively operated by means of solenoid valves 40, 41 and 42 by which air in the tubing 33 is directed into the cylinders 34, 35 and 36 under the control of the switches 24 and 25 and timers 26 and 27 as described below. A solenoid valve 43 in the tubing 33 controls the delivery of air to the vibrators 19 for operating same.

The squeeze valves 37, 38 and 39 each include a fixed base portion 44 and a movable anvil portion 45 secured to the cylinder rod 46 and adapted to move therewith against the respective flexible tube for squeezing same to a closed condition against the base portion 44 upon actuation of the air cylinder.

The squeeze valves 37, 38 and 39, the solenoid valve 43 and the electric motor 16 are suitable electrically interconnected by wires 47 with the switches 24 and 25 and the timers 26 and 27 to operate with respect to each other as follows. The "on" timer 26 during its timing cycle maintains a feeding condition wherein the valves 37 and 38 are open, the vibrators 19 and the motor 16 are operating and the valve 39 is closed. Upon completing its cycle the "on" timer 26 actuates the "off" timer 27. The "off" timer 27, during its timing cycle maintains a by-pass condition wherein the valves 37 and 38 are closed, the vibrators 19 and motor 16 are inoperative and the valve 39 is open for by-passing air around the isolated air lock feeder 10. Upon completion of its cycle the "off" timer 27 actuates the "on" timer 26. The high pressure switch 24 is connected into the circuit for temporarily overriding the "on" timer 26 when a predetermined high back-pressure is reached in the pipe 7, causing an immediate reversion to the by-pass condition, that is, no feeding of material and air passing through the by-pass tube 22. The low pressure switch 25 prevents the actuation of the "on" timer 26 so that a feeding condition cannot be initiated until the back-pressure in the system has dropped below a predetermined point. Details of the circuit will be apparent to those skilled in the art in view of this description and need not be discussed further herein.

By way of operation assume that the back-pressure in the system is less than the set point of the low pressure switch 25 which indicates that the conveying tube or pipe 4 is sufficiently cleared to accept more material 2. The "on" timer 26 is actuated upon completion of the cycle of the "off" timer 27. A feeding condition is initiated whereby air travels through the tube 9 urging a substantially continuous slug 48 of material through the feeder outlet tube 20 and along the conveying pipe 4 under differential pressure. When the "on" timer completes its cycle the "off" timer is actuated causing the feeding condition to cease and the air to by-pass the air lock feeder 10 through the by-pass tube 22 for a predetermined period. This produces a space 49 between each of the moving slugs 48.

If, during the feeding condition the back-pressure as sensed in the tube 7 increases to a point where the high pressure switch 24 is actuated, an immediate cessation of the feeding condition occurs and the by-pass of air into the conveying pipe 4 is initiated. This by-pass condition will continue until the pressure has dropped to a point, as determined by the operation of the low pressure switch 25, which will permit the "on" timer 26 to again control feeding. If excess pressure in the system is not produced the "on" timer 26, as noted above, will continue its cycle until completion whereupon the "off" timer 27 will produce the by-pass condition for a predetermined period. The by-pass condition however, will continue indefinitely unless the low-pressure switch 25 is actuated by a lowering of pressure indicating sufficient freedom of downstream flow in the conveying pipe 4. If, after high pressure switch actuation, the low pressure switch actuating level is reached before the cycle of the "on" timer 26 is completed, feeding will begin and continue until completion of the "on" timer cycle. Otherwise, no feeding will occur until the "off" timer finishes its cycle.

The tube or pipe 4 is preferably of flexible and expansible material such as rubber to permit local expansion about a slug tending to form a more or less stationary obstruction and thus release the slug to continue along the conveying pipe.

Under some circumstances one or both of the timers 26 and 27 may be eliminated whereupon the system will operate strictly upon the response of the high and low pressure switches 24 and 25. If both timers are eliminated, material will be fed into the pipe until the back-pressure reaches a level causing actuation of the high pressure switch 24 which will then initiate the by-pass condition. The by-pass condition will remain in effect until the back-pressure has been reduced to a level causing actuation of the low pressure switch 25 whereupon closure of the by-pass tube 22 and feeding will again begin. If only the "on" timer 26 is eliminated material will be fed until the high pressure switch 24 is actuated and the by-pass condition will cause separation of the succeeding slugs 48 for time intervals not less than that governed by the "off" timer but which may be extended further due to high back-pressure. The elimination of only the "off" timer 27 will have the effect of producing the spaces 49 between the succeeding slugs to that corresponding to the time it takes the back-pressure to drop to the actuating level of the low pressure switch 25.

By providing time interval controls for the timers 26 and 27 and actuating pressure controls for the switches 24 and 25 a highly flexible system is formed which can be efficiently utilized for conveying many finely divided or powdered materials under different conditions including various lengths of conveying tubes. Although certain forms of this invention have been illustrated and described, it is not to be limited to the specific form or arrangement of parts herein described and shown except insofar as such limitations are included in the claims.

What I claim and desire to secure by Letters Patent is:

1. The method of conveying finely divided compactable material downstream within an elongated pipe comprising:
    (a) introducing said material into said pipe at a point of introduction while injecting a fluid under pressure into said pipe upstream from said point of introduction, said material forming an elongated slug urged into downstream motion by said fluid, and
    (b) periodically interrupting said material introduction while simultaneously initiating the injection of a fluid under pressure into said pipe downstream from said point of introduction and behind said slug to space said slug from succeeding slugs.

2. The method as set forth in claim 1 wherein said last named injection of fluid under pressure is accomplished by by-passing said first named fluid around said point of introduction.

3. Apparatus for conveying finely divided compactable material in a downstream direction within an elongated pipe comprising;
    (a) a source of compressed fluid, a fluid lock feeder communicating with said source and said elongated pipe for feeding said material from said feeder downstream within said elongated pipe in response to compressed fluid flow through said feeder, and
    (b) automatic means associated with said feeder for automatically periodically interrupting the flow of said fluid into said feeder while simultaneously initiating the injection of said fluid within said elongated pipe behind material in said elongated pipe.

4. Apparatus for conveying finely divided compactable material in a downstream direction within an elongated pipe comprising;
    (a) a source of compressed air and an air lock material feeder, a first pipe communicating between said air source and said feeder, a second pipe communicating between said feeder and said elongated pipe, a third pipe communicating between said first pipe and second pipe,
    (b) first, second and third valve means respectively associated with said first, second and third pipes, and control means associated with said valve means and said feeder, said control means being adapted to operate said valve means for restricting air flow through said first pipe and restricting air and material flow through second pipe while permitting air flow through said third pipe creating a by-pass condition, said control means alternately restricting air flow through said third pipe while permitting air flow through said first pipe and permitting air and material flow through said second pipe and actuating said feeder creating a feeding condition,
    (c) said control means including a high pressure switch and a low pressure switch respectively adapted to monitor the pressure in said first pipe, said high pressure switch being adapted to produce said by-pass condition upon actuation thereof by rising system back-pressure to a predetermined level, said low pressure switch being adapted to prevent initiation of said feeding condition until actuation thereof by falling system back-pressure to a predetermined level.

5. The apparatus as set forth in claim 4 wherein;
(a) said first, second and third pipes are transversely resiliently collapsible and said valve means are adapted to transversely collapse said first, second and third pipes for restricting flow therethrough.

6. The apparatus as set forth in claim 4 wherein;
(a) said control means includes a timer for maintaining said feeding condition a predetermined interval, said high pressure switch being adapted to override said timer to produce said by-pass condition.

7. The system as set forth in claim 6 wherein;
(a) said control means includes a second timer adapted to maintain the duration of said by-pass condition for a predetermined interval following completion of said first named timer interval.

8. Apparatus for conveying finely divided compactible material in a downstream direction within an elongated pipe comprising:
(a) a source of compressed fluid, a fluid lock feeder communicating with said source and said elongated pipe for feeding said material from said feeder downstream within said elongated pipe, and
(b) automatic means associated with said feeder for interrupting said feeding and simultaneously injecting compressed fluid within said elongated pipe behind material in said elongated pipe,
(c) said automatic means including a pressure actuated switch sensitive to the pressure of the compressed fluid near said feeder and adapted to interrupt said feeding upon sensing a predetermined maximum pressure.

9. The system as set forth in claim 8 wherein;
(a) said automatic means includes a second pressure actuated switch, said second switch being sensitive to the pressure of the compressed fluid near said feeder and adapted to prevent said feeding unless a predetermined minimum pressure is first sensed.

10. The apparatus as set forth in claim 8 wherein;
(a) said automatic means includes a timer adapted to maintain said feeding for a predetermined time interval unless overridden by said switch.

11. The apparatus as set forth in claim 10 wherein;
(a) said automatic means includes a second timer adapted to prevent said feeding for a predetermined time interval following the completion of the time interval of said first named timer.

References Cited by the Examiner

UNITED STATES PATENTS

| | | | |
|---|---|---|---|
| 1,223,586 | 4/1917 | Johnson | 302—64 |
| 1,450,903 | 4/1923 | Newhouse | 302—42 |
| 2,261,347 | 11/1941 | Di Santo | 302—64 |
| 2,391,484 | 12/1945 | Seymour | 302—64 |
| 2,827,333 | 3/1958 | Wallin | 302—42 |
| 3,202,320 | 8/1965 | Patton | 302—42 |

FOREIGN PATENTS 874,877   5/1953   Germany.

ANDRES H. NIELSEN, *Primary Examiner.*